(12) United States Patent
Brame

(10) Patent No.: US 12,006,622 B2
(45) Date of Patent: Jun. 11, 2024

(54) APPARATUSES AND METHODS FOR A REMOVABLE STRUCTURAL SUPPORT

(71) Applicant: Jennifer G. Brame, Wendell, NC (US)

(72) Inventor: Jennifer G. Brame, Wendell, NC (US)

( * ) Notice: Subject to any disclaimer, the term of this patent is extended or adjusted under 35 U.S.C. 154(b) by 59 days.

(21) Appl. No.: 17/478,393

(22) Filed: Sep. 17, 2021

(65) Prior Publication Data

US 2022/0081829 A1  Mar. 17, 2022

Related U.S. Application Data

(60) Provisional application No. 63/079,701, filed on Sep. 17, 2020.

(51) Int. Cl.
| | | |
|---|---|---|
| *D06F 57/12* | (2006.01) | |
| *B60R 7/08* | (2006.01) | |
| *D06F 57/00* | (2006.01) | |
| *D06F 53/02* | (2006.01) | |
| *D06F 53/04* | (2006.01) | |

(52) U.S. Cl.
CPC ............... *D06F 57/12* (2013.01); *B60R 7/08* (2013.01); *D06F 57/00* (2013.01); *D06F 53/02* (2013.01); *D06F 53/04* (2013.01)

(58) Field of Classification Search
CPC .......... D06F 57/12; D06F 53/02; D06F 53/04; D06F 57/04; D06F 53/00; D06F 57/08; D06F 57/00; B60R 7/08; B65D 2519/00164; B65D 2519/00532; A47F 5/13; A47F 5/135; A47G 25/0664
See application file for complete search history.

(56) References Cited

U.S. PATENT DOCUMENTS

| | | | | | |
|---|---|---|---|---|---|
| 1,852,631 | A | * | 4/1932 | Villemure | A47B 61/003 211/119 |
| 2,274,139 | A | * | 2/1942 | Goldthwait | D06F 57/04 211/197 |
| 2,283,987 | A | * | 5/1942 | Hammar | D06F 53/04 248/539 |
| 2,452,246 | A | * | 10/1948 | Kronhaus | D06F 57/04 211/171 |
| 2,508,491 | A | * | 5/1950 | Cayo | D06F 53/02 211/119.01 |
| 2,887,233 | A | * | 5/1959 | Bybee | D06F 57/12 211/85.3 |
| 3,675,785 | A | * | 7/1972 | Martin | D06F 53/04 296/168 |
| 4,131,205 | A | * | 12/1978 | Malecki | D06F 57/10 211/202 |

(Continued)

*Primary Examiner* — Devin K Barnett
(74) *Attorney, Agent, or Firm* — KDW FIRM PLLC

(57) ABSTRACT

Systems and methods for supporting items from a conveyance (e.g., an automobile, truck, recreational vehicle, boat, and/or camper) for washing and/or drying suitable items. Such systems include bracket(s) that are rigidly attachable to a portion (e.g., a bumper) of the conveyance. Support rod(s) is/are removably attachable to each bracket and extend away from the portion of the conveyance to which the bracket is rigidly attached. Support line(s) is/are attached between the support rods, such that the items supported from the support line(s) are spaced apart from each other to allow for washing, such as using a stream of water, and/or drying, such as using a forced or naturally occurring flow of air around and/or through each of the items.

18 Claims, 10 Drawing Sheets

(56) References Cited

U.S. PATENT DOCUMENTS

| | | | | |
|---|---|---|---|---|
| 4,421,260 | A * | 12/1983 | DeVore | B60R 9/065 |
| | | | | 224/927 |
| 5,582,304 | A * | 12/1996 | Dishon, Jr. | B60P 3/36 |
| | | | | 224/482 |
| 6,095,387 | A * | 8/2000 | Lipscomb | B60R 9/10 |
| | | | | 224/521 |
| 6,712,248 | B2 * | 3/2004 | Mitchell | B60R 9/06 |
| | | | | 224/498 |
| 7,063,220 | B2 * | 6/2006 | Jackson | D06F 57/08 |
| | | | | 211/195 |
| 7,104,412 | B2 * | 9/2006 | Yong | D06F 57/08 |
| | | | | 403/258 |
| 7,273,154 | B1 * | 9/2007 | Edwards | D06F 53/045 |
| | | | | 211/195 |
| 10,294,603 | B2 * | 5/2019 | Brammer, Jr. | D06F 57/04 |
| 11,649,580 | B1 * | 5/2023 | Tarasova | D06F 57/08 |
| | | | | 211/85.3 |
| 2005/0285362 | A1 * | 12/2005 | Williamson | B62D 61/00 |
| | | | | 280/78 |
| 2007/0034656 | A1 * | 2/2007 | Davis | A47G 25/06 |
| | | | | 224/497 |
| 2010/0219145 | A1 * | 9/2010 | De Boer | D06F 57/12 |
| | | | | 211/119.1 |
| 2012/0012548 | A1 * | 1/2012 | Stringer | D06F 53/04 |
| | | | | 211/119.01 |
| 2016/0214541 | A1 * | 7/2016 | Lovejoy | B60R 9/00 |
| 2022/0161734 | A1 * | 5/2022 | Duyette | B60R 9/06 |

* cited by examiner

APPARATUSES AND METHODS FOR A REMOVABLE STRUCTURAL SUPPORT

CROSS-REFERENCE TO RELATED APPLICATION

This application claims priority to provisional patent application No. 63/079,701, which was filed Sep. 17, 2020, the entire content of which is incorporated by reference herein.

TECHNICAL FIELD

The disclosure herein relates to apparatuses and methods for hanging items suspended from a structure. More particularly, the disclosure herein relates to hanging items from a movable conveyance, such as a recreational vehicle, such that the items are spaced apart from each other to allow for the cleaning and/or drying of such items while suspended from the structure.

BACKGROUND

Camping is a widely utilized family-friendly activity that is growing in popularity. Whether camping occurs in a tent, a camper, a recreational vehicle (RV), or even out of a conventional automobile or truck, water-based activities remain popular with campers. As a result of such water-based activities, the clothing (e.g., swimwear) and/or linens (e.g., towels) of participants often become wet and need to be dried. It is also necessary to sometimes wash items brought camping, leaving such items wet. Most commonly, free-standing drying racks are deployed and the wet clothing and/or linens are suspended therefrom to air dry. However, such free-standing drying racks generally have rigid frames that are not readily disassembled and, as such, require significant space for storage when not in use. Additionally, it may be necessary to provide weights in and/or over the base of such free-standing drying racks in order to prevent them from tipping over and/or collapsing in the breeze, which is an especially significant problem when they are top-heavy from having wet garments and/or linens suspended thereon. As such, it may also be difficult and/or time-consuming to deploy and sufficiently secure such conventionally known free-standing drying racks. A similar issue is associated with storing such conventionally known free-standing drying racks. As such, a need exists for a support structure capable that addresses each of the deficiencies known from conventional free-standing drying racks.

SUMMARY

The presently disclosed subject matter is related to apparatuses and methods for a removable support structure that is capable of being deployed and/or attached to a conveyance (e.g., a recreational vehicle, camper, automobile, and the like) in a manner that allows for the support structure to be quickly and easily attached and/or removed from the conveyance and, while attached, to support items suspended therefrom. In some embodiments, the portion of the conveyance to which the support structure is attachable is a front or rear bumper or other structure associated with and/or rigidly attached to the frame of the conveyance, including to the frame of the conveyance itself. The support system can have brackets by which the support system is attached to the conveyance at least at two points, which are spaced apart from each other. The support system can further have, extending from each bracket, one or more support rods, which are spaced apart from each other. The support system further comprises one or more support lines attached to, and extending between, the support rods, the support lines being configured to have items (e.g., garments, linens, and/or any other items about which it is desired to allow an airflow to pass through and/or about) draped thereover to allow for an airflow around and/or through the items, preferably to dry the items (e.g., by convectively reducing a moisture content therein).

According to an example embodiment, an apparatus for supporting one or more items in an air flow from a conveyance is disclosed herein, the apparatus comprising: at least one bracket configured for rigid attachment to a portion of the conveyance; first and second support rods that are removably attachable to the at least one bracket and extend away from the portion of the conveyance; and at least one support line attached between the first and second support rods, the at least one support line being configured such that the one or more items are supported from the at least one support line in a manner such that each of the one or more items is substantially spaced apart from others of the one or more items to allow the air flow around and/or through each of the one or more items.

In some embodiments of the apparatus, the at least one bracket comprises a first bracket and a second bracket, and wherein the first bracket is spaced apart from the second bracket along a length of the portion of the conveyance.

In some embodiments of the apparatus, the first and second brackets each comprise a coupling portion, which is configured for at least partial insertion within an end of the portion of the conveyance, and an attachment portion, which extends beyond the end of the portion of the conveyance and is configured to receive one of the first and second support rods.

In some embodiments of the apparatus, the at least one support line comprises a plurality of support lines, wherein the first and second support rods extend away from the attachment portion of the first and second brackets, wherein the first and second support rods have attachment points arranged along a length of the first and second support rods, and wherein each of the plurality of support lines is attached between corresponding ones of the attachment points on the first and second support rods.

In some embodiments of the apparatus, the attachment points of the first support rod and the attachment points of the second support rods have a substantially identical spacing pattern, such that each of the plurality of support lines are substantially parallel to each other.

In some embodiments of the apparatus, the attachment portions of the first and second brackets comprise a channel, which has an internal cross-sectional profile that is substantially similar to an outer cross-sectional profile of the first and second rods, such that one of the first and second rods can be inserted through the channel for support from the bracket.

In some embodiments of the apparatus, the first and second brackets each comprise a coupling portion, which is configured to receive, at least partially, an end of the portion of the conveyance therein, and an attachment portion, which extends beyond the end of the portion of the conveyance and is configured to receive one of the first and second support rods.

In some embodiments of the apparatus, the first and second support rods extend away from the at least one bracket in a direction that is inclined at an angle from a vertical direction, the vertical direction being orthogonal to a direction of transit of the conveyance.

In some embodiments of the apparatus, the at least one bracket comprises a metal and/or a plastic, wherein the first and second support rods comprise a metal, and wherein the at least one support line comprises a metal or a textile material.

In some embodiments of the apparatus, the conveyance comprises an automobile, truck, recreational vehicle, boat, and/or camper.

According to another example embodiment, a method of supporting one or more items in an air flow from a conveyance is provided, the method comprising: rigidly attaching at least one bracket to a portion of the conveyance; attaching first and second support rods to the at least one bracket in a removable manner, such that the first and second support rods extend away from the portion of the conveyance; attaching at least one support line between the first and second support rods; and placing the one or more items for support from the at least one support line, such that each of the one or more items is substantially spaced apart from others of the one or more items to allow the air flow around and/or through each of the one or more items.

In some embodiments of the method, the at least one bracket comprises a first bracket and a second bracket, and wherein the first bracket is spaced apart from the second bracket along a length of the portion of the conveyance.

In some embodiments of the method, the first and second brackets each comprise a coupling portion and an attachment portion, the method comprising: at least partially inserting the coupling portion within an end of the portion of the conveyance; and receiving one of the first and second support rods within the attachment portion; wherein the attachment portion extends beyond the end of the portion of the conveyance when the coupling portion is inserted into the end of the portion of the conveyance.

In some embodiments of the method, the at least one support line comprises a plurality of support lines, wherein the first and second support rods extend away from the attachment portion of the first and second brackets, wherein the first and second support rods have attachment points arranged along a length of the first and second support rods, and wherein each of the plurality of support lines is attached between corresponding ones of the attachment points on the first and second support rods.

In some embodiments of the method, the attachment points of the first support rod and the attachment points of the second support rods have a substantially identical spacing pattern, such that each of the plurality of support lines are substantially parallel to each other.

In some embodiments of the method, the attachment portions of the first and second brackets comprise a channel, which has an internal cross-sectional profile that is substantially similar to an outer cross-sectional profile of the first and second rods, such that one of the first and second rods can be inserted through the channel for support from the bracket.

In some embodiments of the method, the first and second brackets each comprise a coupling portion and an attachment portion, the method comprising: receiving, at least partially, an end of the portion of the conveyance within the coupling portion; and receiving one of the first and second support rods within the attachment portion; wherein the attachment portion extends beyond the end of the portion of the conveyance when the coupling portion is inserted into the end of the portion of the conveyance.

In some embodiments of the method, the first and second support rods extend away from the at least one bracket in a direction that is inclined at an angle from a vertical direction, the vertical direction being orthogonal to a direction of transit of the conveyance.

In some embodiments of the method, the at least one bracket comprises a metal and/or a plastic, wherein the first and second support rods comprise a metal, and wherein the at least one support line comprises a metal or a textile material.

In some embodiments of the method, the conveyance comprises an automobile, truck, recreational vehicle, boat, and/or camper.

DETAILED DESCRIPTION

Figure 1A:
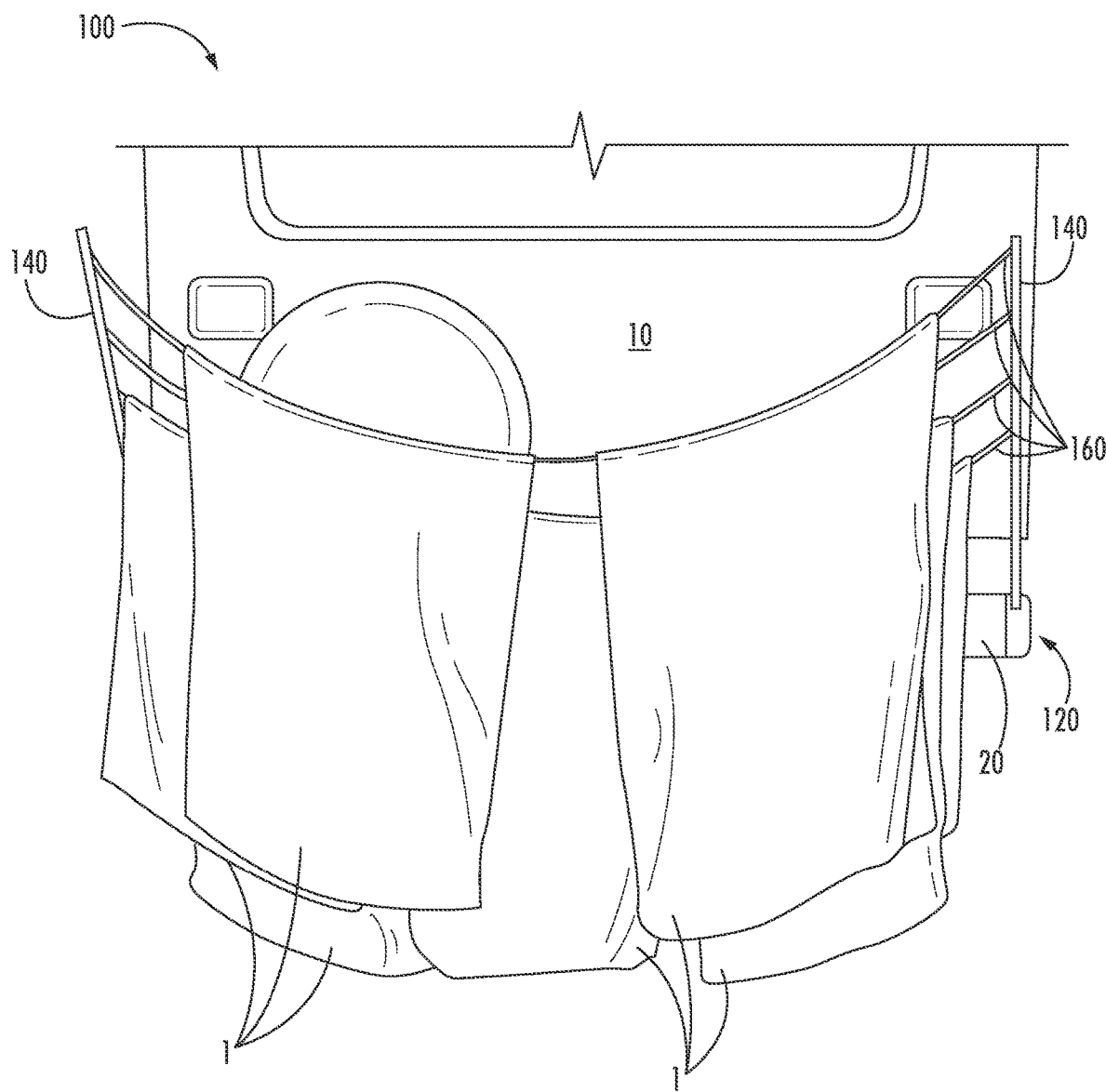
FIGS. 1A and 1B are views of an example embodiment of a removable support structure suitable for suspending items therefrom in a spaced apart manner.

The terminology used herein is for the purpose of describing particular embodiments only and is not intended to be limiting of the presently disclosed subject matter.

While the following terms are believed to be well understood by one of ordinary skill in the art, the following definitions are set forth to facilitate explanation of the presently disclosed subject matter.

All technical and scientific terms used herein, unless otherwise defined below, are intended to have the same meaning as commonly understood by one of ordinary skill in the art. References to techniques employed herein are intended to refer to the techniques as commonly understood in the art, including variations on those techniques or substitutions of equivalent techniques that would be apparent to one skilled in the art. While the following terms are believed to be well understood by one of ordinary skill in the art, the following definitions are set forth to facilitate explanation of the presently disclosed subject matter.

In describing the presently disclosed subject matter, it will be understood that a number of techniques and steps are disclosed. Each of these has individual benefit and each can also be used in conjunction with one or more, or in some cases all, of the other disclosed techniques.

Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Following long-standing patent law convention, the terms "a", "an", and "the" refer to "one or more" when used in this application, including the claims. Thus, for example, reference to "a support line" includes a plurality of such support lines, and so forth.

Unless otherwise indicated, all numbers expressing quantities of ingredients, reaction conditions, and so forth used in the specification and claims are to be understood as being modified in all instances by the term "about". Accordingly, unless indicated to the contrary, the numerical parameters set forth in this specification and attached claims are approximations that can vary depending upon the desired properties sought to be obtained by the presently disclosed subject matter.

As used herein, the term "about," when referring to a value or to an amount of a composition, mass, weight, temperature, time, volume, concentration, percentage, etc., is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

The term "comprising", which is synonymous with "including" "containing" or "characterized by" is inclusive or open-ended and does not exclude additional, unrecited elements or method steps. "Comprising" is a term of art used in claim language which means that the named elements are essential, but other elements can be added and still form a construct within the scope of the claim.

As used herein, the phrase "consisting of" excludes any element, step, or ingredient not specified in the claim. When the phrase "consists of" appears in a clause of the body of a claim, rather than immediately following the preamble, it limits only the element set forth in that clause; other elements are not excluded from the claim as a whole.

As used herein, the phrase "consisting essentially of" limits the scope of a claim to the specified materials or steps, plus those that do not materially affect the basic and novel characteristic(s) of the claimed subject matter.

With respect to the terms "comprising", "consisting of", and "consisting essentially of", where one of these three terms is used herein, the presently disclosed and claimed subject matter can include the use of either of the other two terms.

As used herein, the term "and/or" when used in the context of a listing of entities, refers to the entities being present singly or in combination. Thus, for example, the phrase "A, B, C, and/or D" includes A, B, C, and D individually, but also includes any and all combinations and subcombinations of A, B, C, and D.

Referring now to the figures, FIGS. 1A to 2B show various aspects of an example embodiment of a support structure, generally designated 100, which is removably attached to a conveyance 10 (e.g., a recreational vehicle, such as a "motorhome," "trailer," "camper," automobile, truck, bus, boat, and the like). In this example embodiment, the support structure 100 is removably attached to a portion 20 of the conveyance 10. The portion 20 can be attached and/or provided on the conveyance 10 at the front, rear, sides, top, and/or bottom of the conveyance 10. The portion 20 can be, for example and without limitation, a bumper, frame member, or any other suitably rigid structure capable of supporting items 1 that are on (e.g., draped over and/or suspended from) the support structure to allow for drying and/or washing of such items 1 without allowing the items to rotate about the portion 20, relative to the conveyance 10.

Figure 1B:
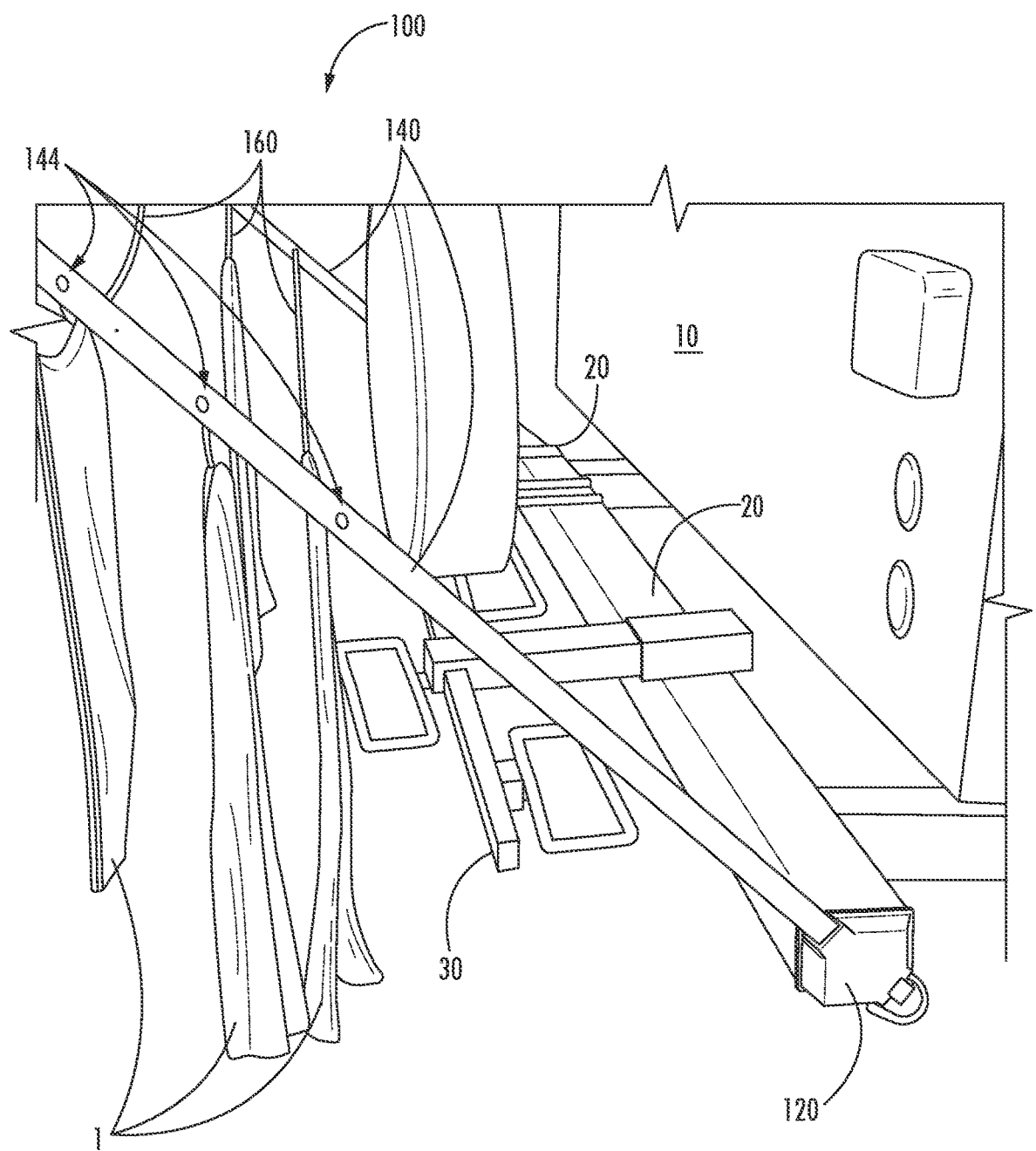
Figure 2A:
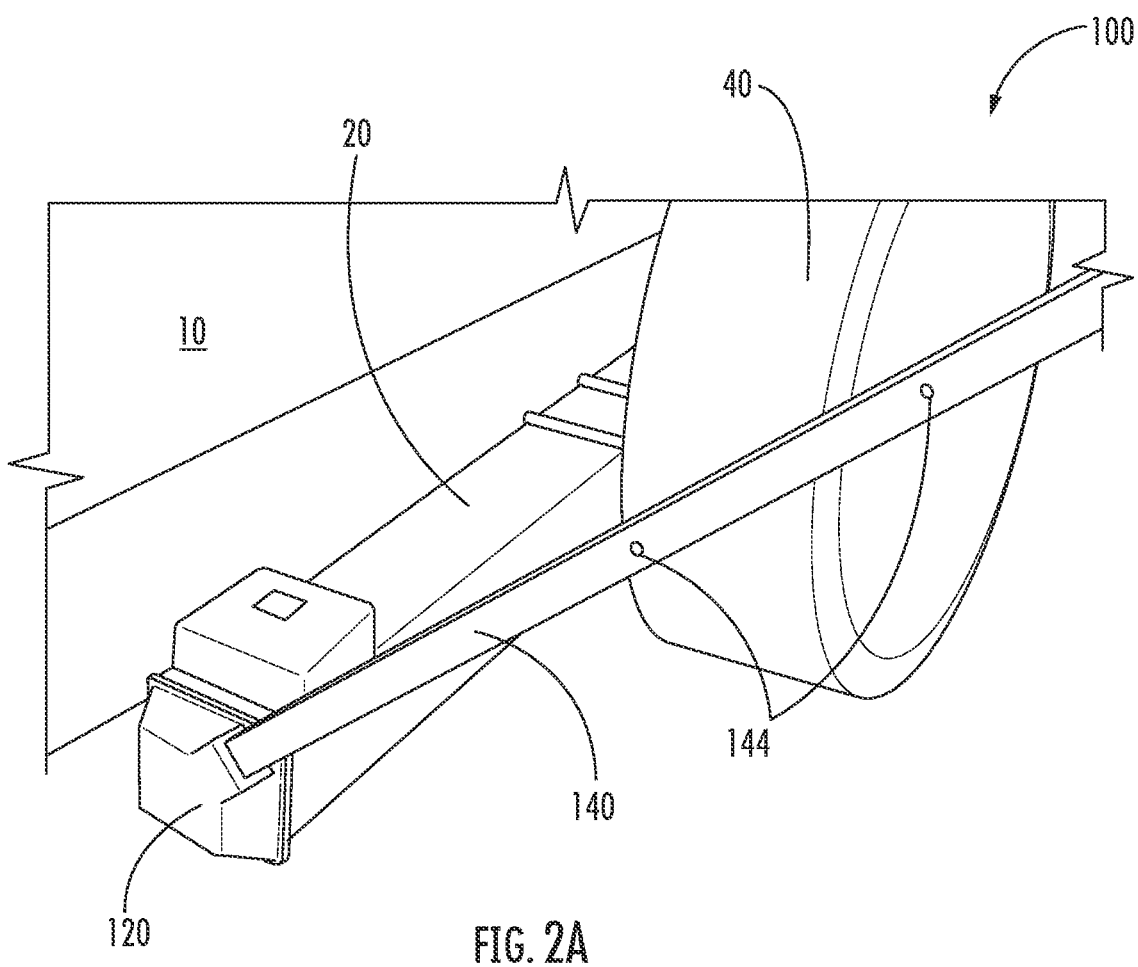
FIGS. 2A and 2B are respective partial views of the removable support structure of FIGS. 1A and 1B.
Figure 2B:
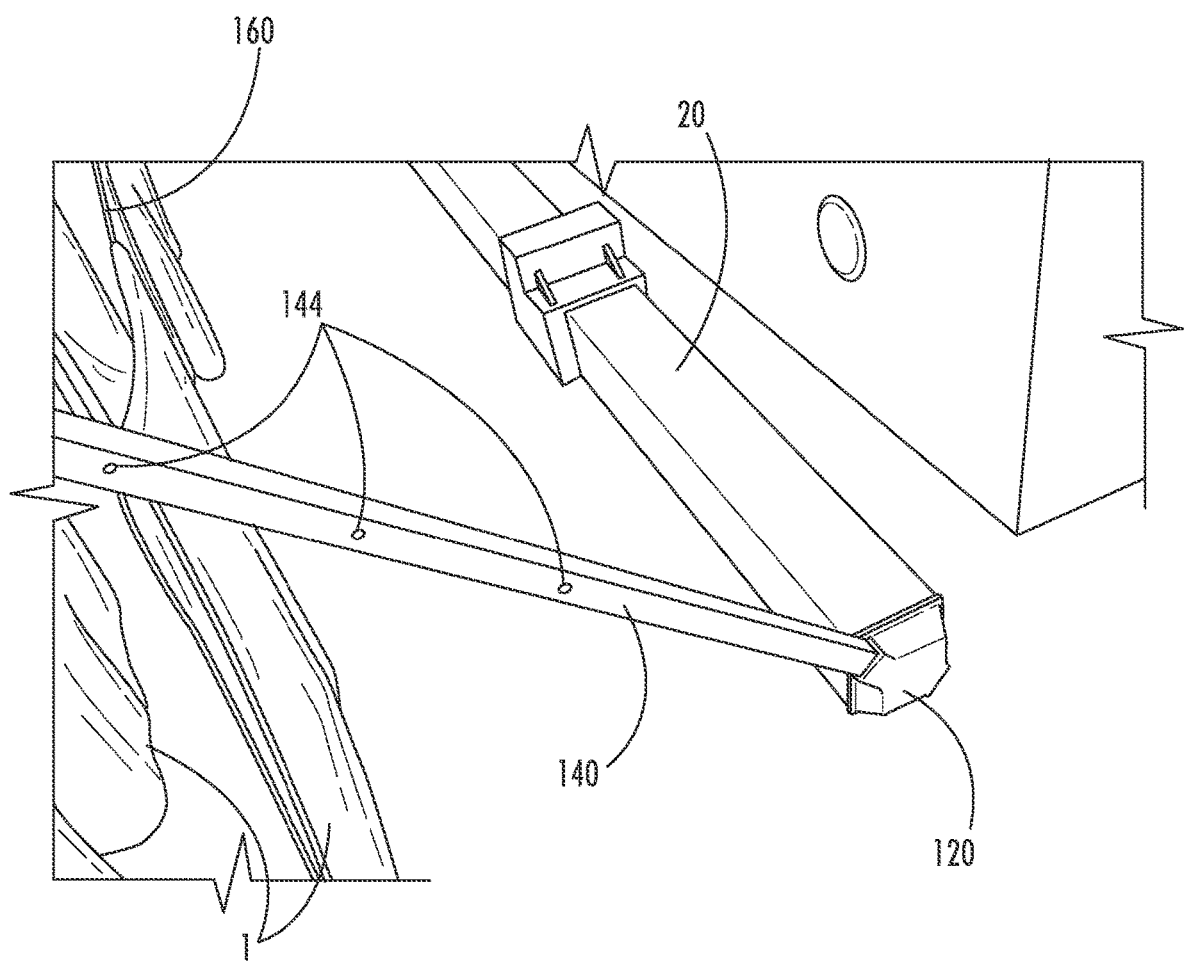
Figure 3A:
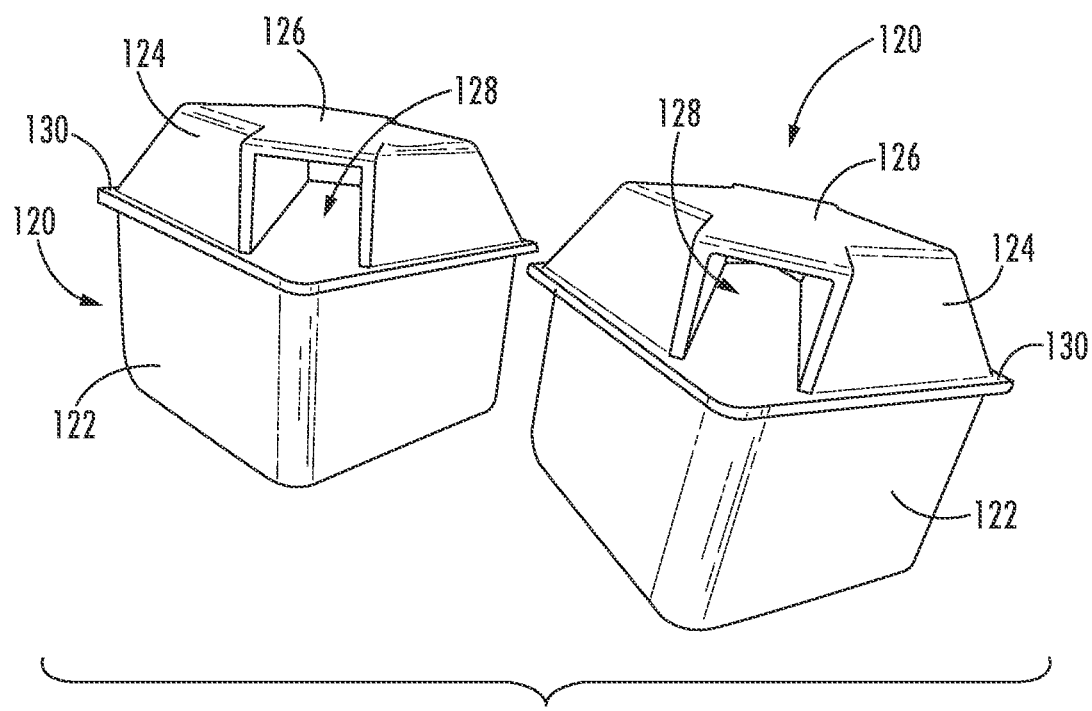
FIGS. 3A-3F are various views of a bracket of the support structure shown in FIGS. 1A-2B.
Figure 3B:
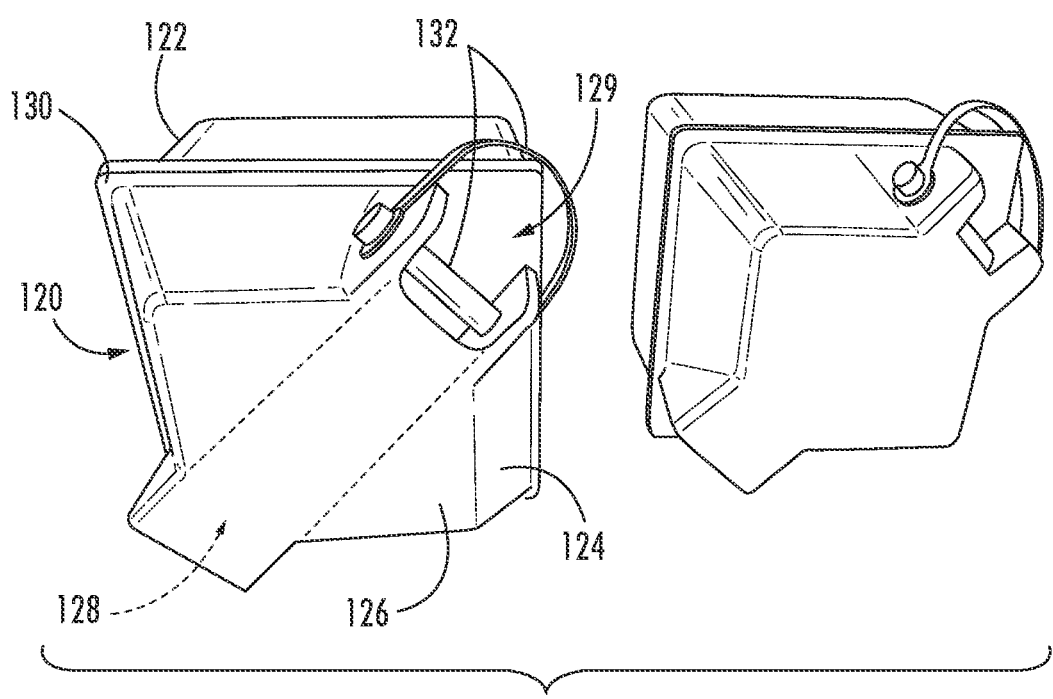
Figure 3C:
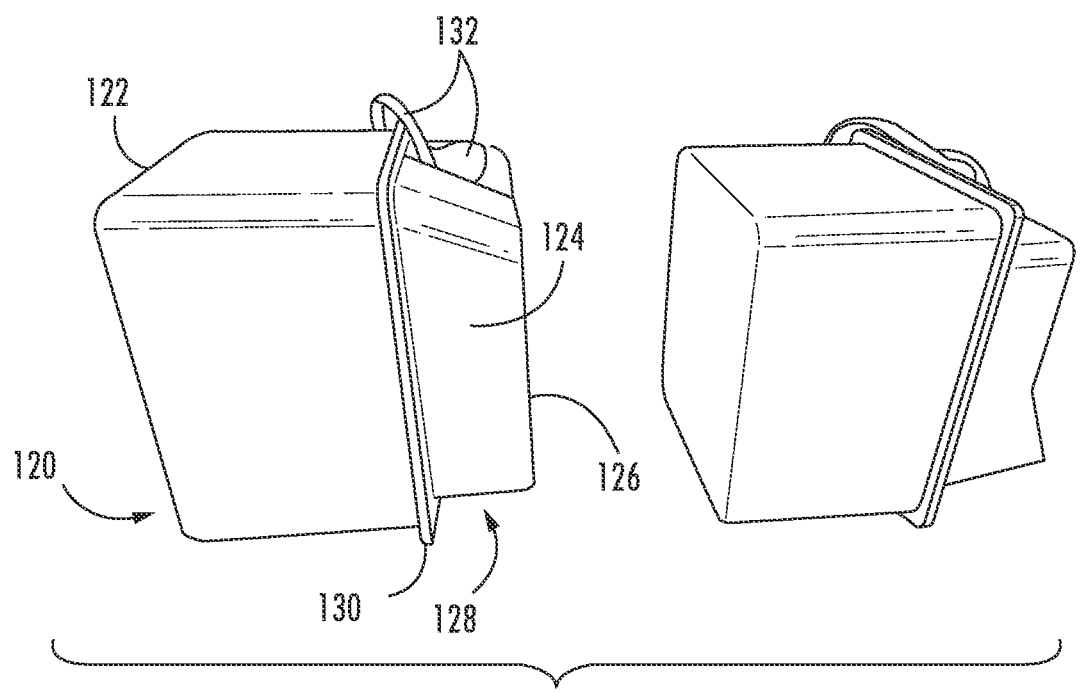
Figure 3D:
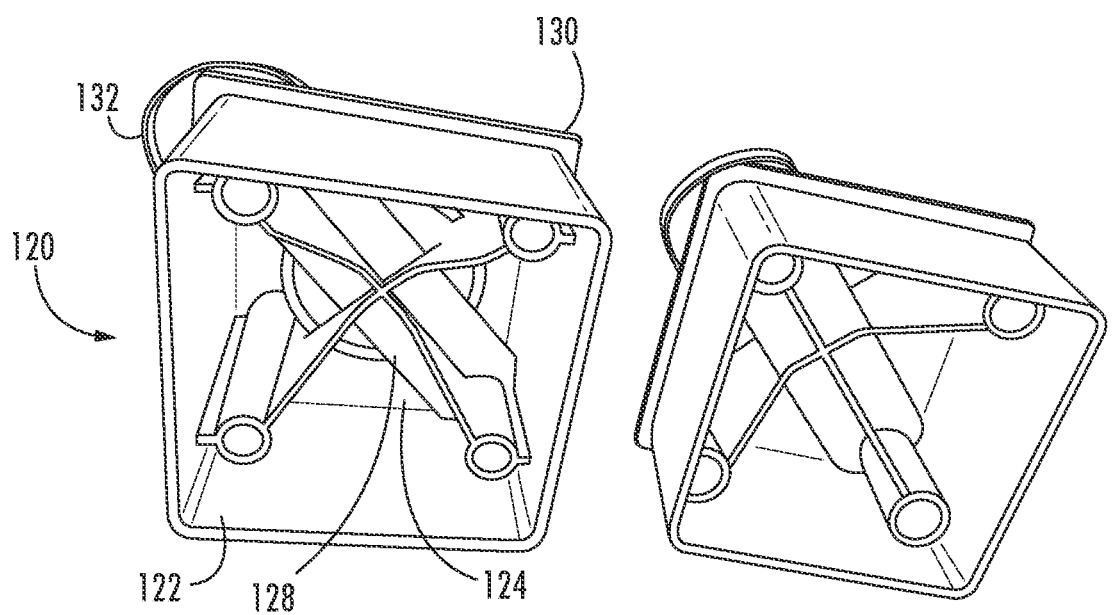
Figure 3E:
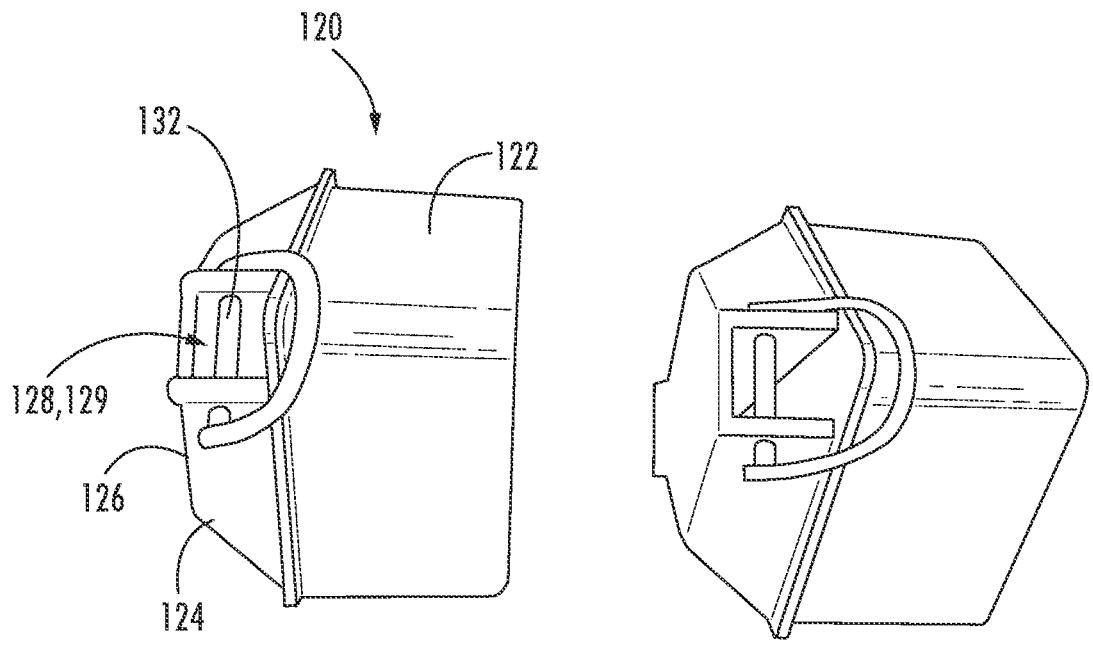
Figure 3F:
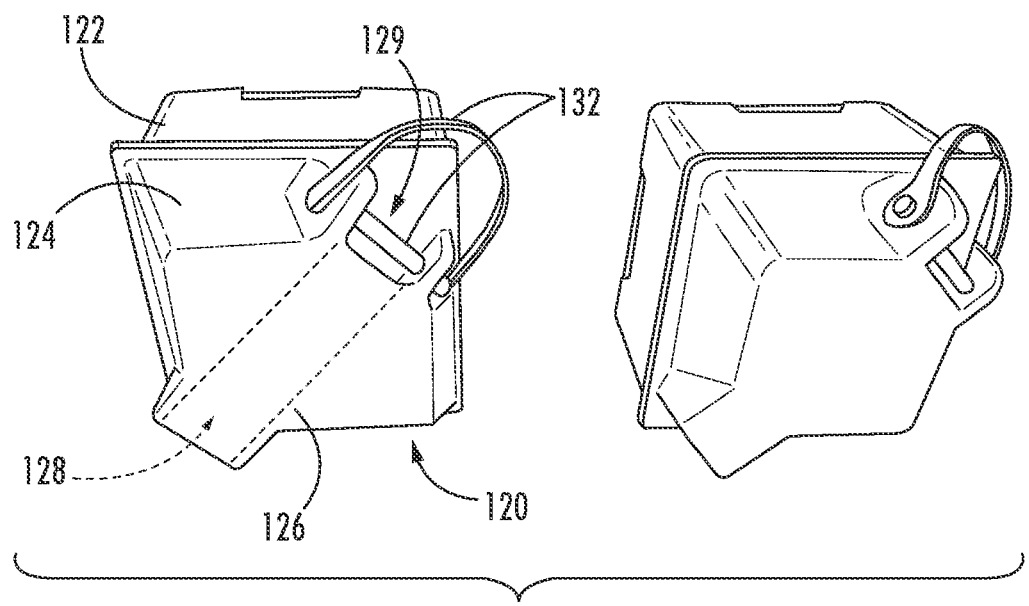

As shown in FIGS. 1A and 1B, one or more (e.g., a plurality of) brackets 120 are rigidly and/or removably affixed to the portion 20 of the conveyance 10. In the example embodiment shown, the support structure 100 comprises a plurality of (e.g., two) brackets 120 are inserted within a hollow section of the portion 20 (e.g., at the longitudinal ends of the bumper of a recreational vehicle). However, the brackets 120 that can be used for such a support system 100 as are disclosed herein are not limited to such a connection type and/or placement. According to an alternate example embodiment, one or more of the brackets 120 are shaped to be inserted over, rather than within, the longitudinal ends of the portion 20 of the conveyance 10, in which case the portion 20 is inserted within a hollow region, or section, formed in such one or more brackets 120. According to another alternate example embodiment, one or more of the brackets 120 are shaped to fit within recesses (e.g., pockets, recesses, tubes, through-holes, and the like) that are formed in and/or through the portion 20 in the vertical, horizontal, or angled (e.g., inclined at an angle between vertical and horizontal) directions, such that the one or more brackets 120 could be installed at any suitable distance from each other along the length of the portion 20 of the conveyance 10. In some embodiments, the support system 100 comprises only a single bracket 120; in such support systems 100, the single bracket 120 may have lateral support extensions and/or flanges to counteract any rotary moments that would cause the support system 100, or any portion thereof, to twist and/or become dislodged from the portion 20 of the conveyance 10 to which the bracket 120 is attached (e.g., due to wind, impact with another object, etc.). The scope of the example embodiments described herein is not to be used to limit the scope of the instant disclosure, which should include equivalent structures that would be understood by persons having ordinary skill in the art.

Still referring to FIGS. 1A to 2B, the example embodiment of the support structure 100 shown therein has two support rods 140. Each support rod 140 is attached to one of the brackets 120 and extends away from the brackets 120 in a generally radial direction (e.g., as defined by a longitudinal axis of the portion 20 and/or of the bracket 120, which can be coaxial with each other in some embodiments). In the example embodiment shown, each support rod 140 extends in a plane that is substantially orthogonal to (e.g., allowing for misalignments due to manufacturing and assembly tolerances of the components of the support structure 100) the direction of the longitudinal axis of the portion 20 of the conveyance 10; however, the orientation of any or all of the support rods 140 is not limited to such an orthogonal extension direction. In the example embodiment shown in FIGS. 1A to 2B, all of the support rods 140 are generally linear in shape and have a generally rectangular cross-sectional shape. In some embodiments, the support rods 140 may have a curved, bent, and/or angularly segmented (e.g., comprising multiple linear or curved pieces that are assembled together, either temporarily or permanently, such that a non-zero angle is formed between one or more, or each, of the adjacent segments when assembled together) profile.

According to an alternate example embodiment, one or more (e.g., all) of the support rods 140 extend away from or towards each other, such that the support rods 140 would have a generally tapering shape, in a plan view orthogonal to the plane formed by the support rods 140, such that the distance between the support rods increases or decreases (e.g., continuously or, in the case of non-linear support rods 140, discontinuously, meaning having a discontinuity) along the length of the support rods 140. Stated somewhat differently, in embodiments in which the support rods 140 are arranged relative to each other such that the direction of extension of the support rods 140 results in the support rods 140 being arranged to taper either towards or away from each other as such support rods 140 extend away from the portion 20 of the conveyance 10 to which such support rods 140 are attached, the portion 20 of the conveyance 10 and the support rods form 3 sides of a generally trapezoidally shaped area, or region, with the support rods 140 forming and/or constituting the angled sides of the trapezoidally shaped area, the portion 20 of the conveyance 10 forming and/or constituting either the short or the long side of the trapezoidally-shaped area, depending on whether the support rods 140 are arranged to extend away from each other or towards each other, respectively, and the open side, or edge of the trapezoidally-shaped area being defined between the distal ends of the support rods 140. As used herein, the term "distal end" refers to the end of the support rod 140 opposite where the support rod 140 is attached to the portion 20 of the conveyance 10. In some embodiments, the brackets 120 are configured to allow for attachment of one of the support rods 140 thereto in a radial direction or in an angled direction (e.g., in which the support rods 140 will extend towards or away from each other). In the example embodiment shown and disclosed herein, the support rods 140 are each generally in the shape of a hollow aluminum bar, which has a generally rectangular cross-sectional shape and a length of, for example, about 48 inches.

Regardless of the particular orientation of the support rods 140 relative to each other, the brackets 120, and/or the portion 20 of the conveyance 10, the support structure 100 comprises one or more (e.g., a plurality of) support lines 160, which extend between, and are connected to, the support rods 140. In the example embodiment shown in FIGS. 1A to 2B, the support lines 160 extend through (e.g., partially and/or entirely) the support rods 140 and are secured on an outer edge of the support rods 140. The support lines 160 can be formed of any suitable material, including a polymeric material, a metallic wire (e.g., solid, braided, coated, etc.), a woven or braided material (e.g., a string or rope), and/or a textile filament (e.g., a thread). In an advantageous example embodiment, the support lines 160 are formed of a corrosion-resistant material, such as nylon, stainless steel, or any other suitable material that is not degraded due to exposure with water and oxygen, or any other component found in ambient air. The support lines 160 are attached to the support rods 140 at attachment points, generally designated 144, which are formed through a portion or an entirety of such support rod 140 and are spaced apart from each other axially along the length of such support rod 140 in which such attachment point(s) 144 are formed.

In some embodiments, a plurality of (e.g., all of, or less than all of) the support lines 160 that are secured between the support rods 140 can be formed of a single support line 160 (e.g., as opposed to being formed from a plurality of individual, unconnected, discrete segments of support line 160). In such embodiments, the single support line 160 passes through multiple attachment points 144 of each support rod 140, for example, in the pattern of an "S" or snake (e.g., a pattern in which the single support line 160 passes through, in succession a first attachment point 144 of a first support rod 140, a first attachment point 144 of a second support rod 140, a second attachment point 144 of the second support rod 140, a second attachment point 144 of the first support rod 140, a third attachment point 144 of the first support rod 140, a third attachment point 144 of the second support rod 140, a fourth attachment point 144 of the second support rod 140, and continuing on in such pattern. In some embodiments, the spacing of the attachment points 144 along each support rod 160 is substantially identical and/or uniform along the length of the support rods 160. The attachment points 144 can be formed, for example and without limitation, from through-holes formed through a thickness (e.g., an entire thickness) of the support rods 140, hooks, keyed holes (e.g., so that the ends of the support lines 160 can be captured therein and held within the support rod 140), and the like.

As shown in FIGS. 1A and 1B, in the example embodiment of the support system 100 shown therein, the support lines 160 are spaced apart far enough to allow for items 1 (e.g., garments, linens, inflatable recreational devices, such as floats, and the like) to be attached to (e.g., draped over and supported on, so as to be entirely spaced apart from the ground by) the support lines 160 and spaced apart from each other (e.g., in the axial direction of the support rods 140) so that the items 1 do not touch each other (e.g., in the absence of a wind that may cause contact between adjacent items 1) when the items are hanging vertically, as defined relative to a gravity vector, from one of the support lines 160. As such, the items 1 are positioned in a manner that allows for each item 1 to be suspended from one of the support lines 160 to allow a flow of air (e.g., a breeze, whether naturally occurring or mechanically induced, such as by a fan or other air moving device) to pass around and/or through each of the items 1 depending on the nature (e.g., permeability to air) and construction type of each item 1. In embodiments in which the support structure 100 is used to wash and/or dry an item 1 that is substantially impermeable to air, such as in the case of an inflatable recreational device, such as a pool float, it may be advantageous for each such item 1 to be positioned over two adjacent support lines 160, such that the portions of the item 1 hanging from the support lines 160 are spaced apart from each other. As such, the support structure 100 is configured such that items supported from the support lines 160 are capable of being dried via convective and/or radiant evaporation. The support structure 100 is also configured such that Items 1 that are suspended from one or more of the support lines 160 can be washed by a user spraying such items with a stream of water, such as from a hose or other suitable water source, for cleaning such items 1 while the items 1 are suspended on the support lines 160 and then allowing the items 1 to remain on the support lines 16 to dry after the items 1 have been washed.

FIG. 1B shows that, in the example embodiment shown therein, the support structure 100, by being positioned at, and attached to, the longitudinal ends of the portion 20 of the conveyance 10, can be attached to the conveyance 10 and used for supporting items 1 thereon without having to remove other structures and/or accessories from the conveyance 10, or even the portion 20 of the conveyance 10, prior to the support structure 100 being attached to the conveyance 10, or to the portion 20 of the conveyance 10. Examples of such structures and/or accessories can include, for example, a spare tire 40 and/or a bicycle rack 30 for supporting bicycles from the conveyance 10 while in motion. In order to better illustrate the features of the example embodiment of the support structure 100, the bicycle rack 30 is removed from the conveyance 10 in FIGS. 2A and 2B. Further examples of such structures and/or accessories will be understood by persons having ordinary skill in the art.

FIGS. 3A through 3F show various aspects of an example embodiment of brackets, generally designated 120, which are suitable for use in securing the support structure 100 to the portion 20 of the conveyance 10, as shown generally in FIGS. 1A to 2B. The scope of the subject matter disclosed herein in relation to the bracket 120 shown in FIGS. 3A through 3F is not limited merely to the example bracket 120 shown therein and necessarily includes various other features and aspects as will be understood by persons having ordinary skill in the art. As shown in FIGS. 3A to 3F, the bracket 120 includes a coupling portion 122 and an attachment portion 124. The coupling portion 122 is configured to be attached to a portion (20, see FIGS. 1A to 2B) of a conveyance (10, see FIGS. 1A to 2B); the portion 20 can be, for example, a bumper or other impact protection structure on the front, rear, side, top, and/or bottom of the conveyance 10. As shown, the coupling portion 122 is configured for insertion within a portion (e.g., 20) of the conveyance (e.g., 10), such as within a bumper of a recreational vehicle. In an example alternate embodiment, the coupling portion 122 can be sized so as to slide over, rather than within, the portion 20 of the conveyance 10. In the example embodiment shown in FIGS. 3A to 3F, the coupling portion 122 has an outer profile and/or perimeter that is substantially similar (e.g. smaller than, but large enough to form an interference fit, such that the bracket 120 cannot be removed without applying a predetermined removal force, which is selected to be greater than any dislodging forces that the bracket 120 may be exposed to during typical use) to an internal profile and/or perimeter of the portion 20 of the conveyance 10 into which the coupling portion 122 of the bracket 120 is configured to be inserted.

The bracket 120 also has an attachment portion 124, which is rigidly connected to the coupling portion 122 (e.g., at flange 130) and has a channel 128 formed through (e.g., internal to, at least in part) the attachment portion 124 to allow for passage of one of the support rods (e.g., 140, FIGS. 1A to 2B) through the attachment portion 124 and to allow for such support rod 140 to be substantially rigidly connected to the bracket 120. The channel 128 has an internal cross-sectional shape that is the same as, or larger than, the cross-sectional shape of the support rod 140 configured for insertion within and/or through the channel 128. The attachment portion 124 comprises an impact surface 126. In the example embodiment shown, the channel 128 is enclosed along the length thereof by the impact surface 126 and is open at each end thereof, with a securing end, generally designated 129, formed where the impacting surfaces 126 is truncated and only the side walls of the channel 128 extending. Each of the side walls that define the securing end 129 has holes formed therein, which are aligned with each other to allow for a fastener 132 to pass through such holes to secure the support rod 140 within the channel 128 of the bracket 120. The channel 128 is inclined at an angle, relative to the generally rectilinearly-arranged outer surfaces, or sides, of the coupling portion 122 and of the flange 130, but embodiments in which the channel 120 is oriented parallel to one of the sides of the coupling portion 122 are within the scope of the subject matter disclosed herein as well. This inclined arrangement of the channel 128 is what allows the support rods 140 to extend away from the portion 20 of the conveyance 10 and to suspend the items 1 away from each other and spaced apart from the conveyance 10 itself. The holes formed in the side walls of the channel are substantially coaxial with each other and oriented substantially orthogonal to the direction of extension of the channel 128. The fastener 132 can be of any suitable sort, including types that do not interface with the holes formed in the side walls of the securing end 129 of the channel 128, however, in the example embodiment shown in FIGS. 3A to 3F, the fastener 132 comprises a pivotable loop section that allows for securing the fastener to the bracket when the loop section is engaged over both ends of the pin.

In the example embodiment shown in FIGS. 3A-3F, the bracket 120 is made from a polymer using an injection molding technique, such that the coupling portion 122 and the attachment portion 124 are integrally formed together (e.g., being formed in a single piece, having a unitary, or monolithic, structure). In some embodiments, the bracket 120 is manufactured using an additive manufacturing (e.g., "3D printing") technique. In some embodiments, the bracket 120 is manufactured, partially or wholly, from a metal material. Due to the likely exposure of the brackets 120 to water during use of the support structure 100, it is advantageous to form the brackets 120, the support rods 140, and/or the support lines 160 from a material that is not corroded (e.g., by oxidation, such as rust) when exposed to water and oxygen in ambient air. Example materials suitable for use in forming the brackets 120, the support rods 140, and/or the support lines 160 include plastics, aluminum, stainless steel, and the like.

During installation, the coupling portion 122 of the bracket 120 is aligned with (e.g., so as to be substantially coaxial with) a hollow section of the portion 20 of the conveyance 10 to which the bracket 120 is to be connected and/or attached and is engaged and/or driven into such hollow section of the portion 20 (e.g., by hammering, as shown in FIGS. 4A-4D). In embodiments in which the bracket 120 is formed so as to be installed over, rather than inside of, the portion 20 of the conveyance 10, installation is substantially similar to that which is described herein for the example embodiment, with the bracket 120 being aligned with, so as to be substantially coaxial with, and fitting around the perimeter of the portion 20 of the conveyance 10. In some embodiments, rather than the bracket 120 being secured to the portion 20 via an interference, or frictional, fit, the bracket is secured to the portion 20 of the conveyance 10 using a removable fastener, which can be any suitable type of fastener that will removably secure the bracket 120 into and/or over the portion 20 of the conveyance 10. Once at least one bracket 120 is secured to the portion 20 of the conveyance 10, one of the support rods 140 is aligned with the channel 128 formed in and/or through the attachment portion 124 of any bracket 120 that is secured to the portion 20 of the conveyance 10; the support rod 140 is then inserted into and/or through the channel 128 until a locking hole formed through the support rod 140 is substantially coaxial with the holes formed in the side walls that define the securing end 129 of the channel 128, through which the pin of the fastener 132 is secured. The pin of the fastener 132 is then inserted through the holes formed in the side walls of the channel 128 and also through the hole formed through the support rod 140, such that the support rod 140 is removably secured to the bracket 120. As used herein, "removably secured" generally refers to a non-permanent attachment that will allow for a nondestructive disengagement of the support rod 140 from the bracket 120, such as by disengaging the fastener 132 from the holes formed through the side walls at the securing end 129 of the channel 128 and the hole formed through the support rod 140 positioned therebetween.

In some embodiments, a depth control feature may be provided within, or at a distal edge of (e.g., at an end opposite where the side walls of the securing end 129 extend from the channel 128), the securing end 129 of the channel 128, at which the fastener 132 is used to secure the support rod 140 within the channel 128. The depth control feature can be, for example and without limitation, a wall, protrusion, or the like, and is configured to prevent the support rod 140 from being inserted axially through the channel 128 to a position beyond which the hole formed through the support rod 140 is coaxial with the holes formed in the side walls that define the securing end 129 of the channel 128, which allows for easier assembly of the support structure 100. In some embodiments, the support rod 140 may be crimped at a position along the length thereof, or otherwise formed, to prevent the insertion of the support rod 140 beyond the position at which the hole formed through the support rod 140 is coaxial with the holes formed in the side walls that define the securing end 129 of the channel 128 to allow for easier assembly of the support structure 100. In some embodiments, the support rod 140 may be formed with a radially-extending protrusion that engages against the entry of the channel 128 to prevent the insertion of the support rod 140 beyond the position at which the hole formed through the support rod 140 is coaxial with the holes formed in the side walls that define the securing end 129 of the channel 128 to allow for easier assembly of the support structure 100. It is advantageous for the thickness of the walls and outer surface(s) of at least the channel 128, the striking surface 126, and the attachment portion 124 to be sufficiently robust to withstand a prying moment exerted on such structures of the bracket 120 by a user, such as via the support rod 140 when inserted within the channel 128, in an effort by the user to remove the bracket 120 from engagement with the portion 20 of the conveyance 10 to which the bracket 120 is attached in a secured manner, such as via an interference, or frictional, fit, during disassembly of the support structure 100 for removal from the conveyance 100 (e.g., in preparation for movement of the conveyance 100).

Figure 4A:
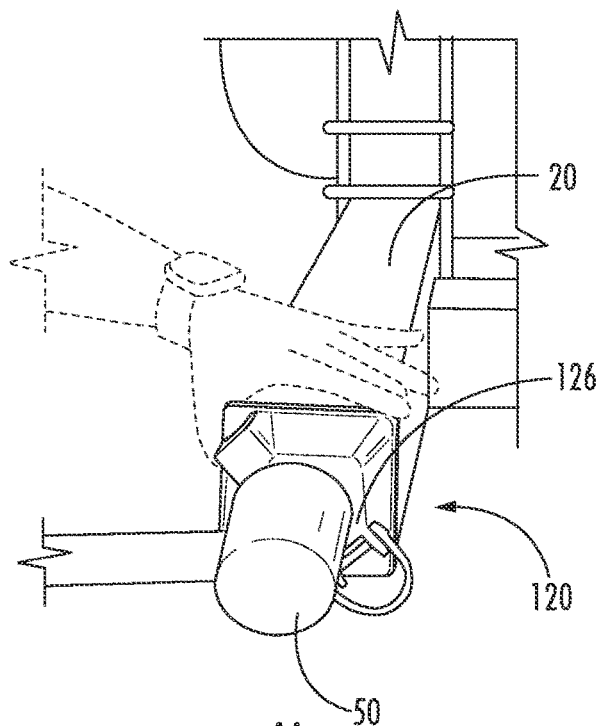
FIGS. 4A-4D show the bracket being installed on a portion (e.g., a bumper) of a conveyance (e.g., a recreational vehicle).
Figure 4B:
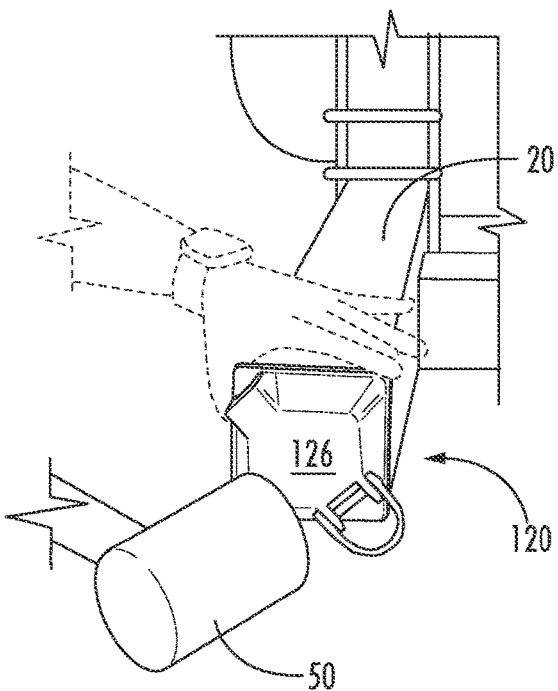
Figure 4C:
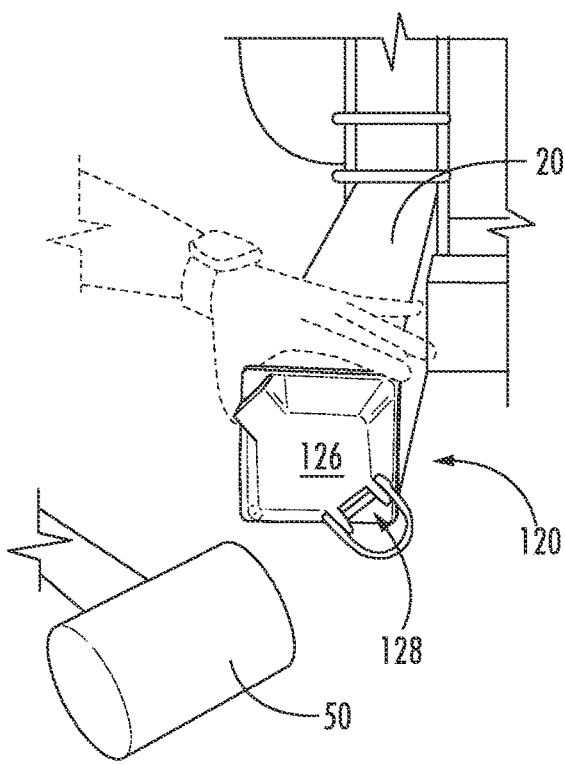
Figure 4D:
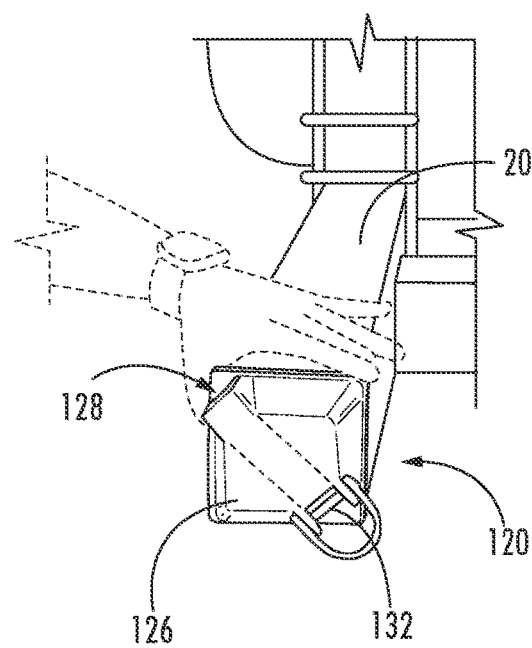

FIGS. 4A through 4D show an example embodiment of a method of inserting the bracket according to the example embodiment shown in FIGS. 1A through 3F is assembled to the portion 20 of the conveyance 10. herein the example illustration of FIGS. 4A through 4D, the portion 20 is a bumper rigidly attached to a recreational vehicle. In FIG. 4A, the bracket 120 is aligned with the bumper, so as to be substantially coaxially aligned with a hollow inner section or region of the portion 20. In FIG. 4B, the bracket 120 has been struck (e.g., using a hammer or any suitable implement) with sufficient force to begin insertion of the bracket 120 within the portion 20, but further engagement of the bracket 120 within the portion 20 is necessary for secure attachment (e.g., via full insertion) of the bracket 120 to the portion 20. As shown, a striking implement 50, such as a rubber mallet or hammer, may advantageously be used to drive the bracket 120 into and/or over the portion 20 of the conveyance 10. FIG. 4C shows that the bracket 120 is almost fully seated within the hollow section of the portion 20 of the conveyance 10, after the bracket 120 was struck by the mallet a sufficient number of time (e.g., several times, which will vary based on manufacturing tolerances and impact forces generated by the striking implement 50). FIG. 4D shows that the bracket 120 is fully seated within the hollow section of the portion 20 of the conveyance 10, which completes the secure attachment of the bracket 120 to the portion 20 of the conveyance 10 in the example method shown. In some embodiments, the bracket(s) 120 of the support structure 100 can remain securely attached to the portion 20 of the conveyance 10, potentially indefinitely, such that the bracket(s) 120 are not removed from the conveyance 10 during a disassembly method of the support structure 100. In some embodiments, the bracket(s) 120 are removable from the portion 20 of the conveyance 10 during disassembly of the support structure 100 from the conveyance 10.

Figure 5A:
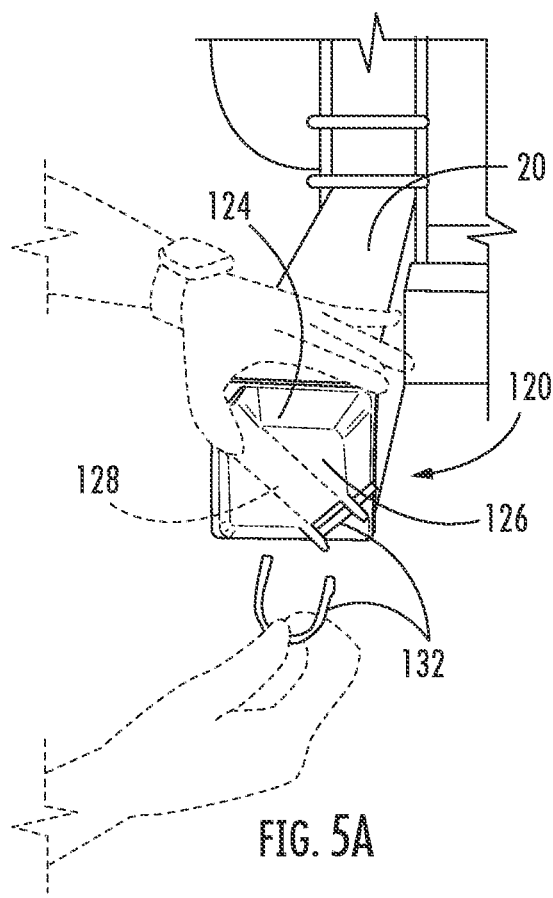
FIGS. 5A and 5B show various aspects of a removable fastener configured for securing a support rod to a bracket of the support structure.
Figure 5B:
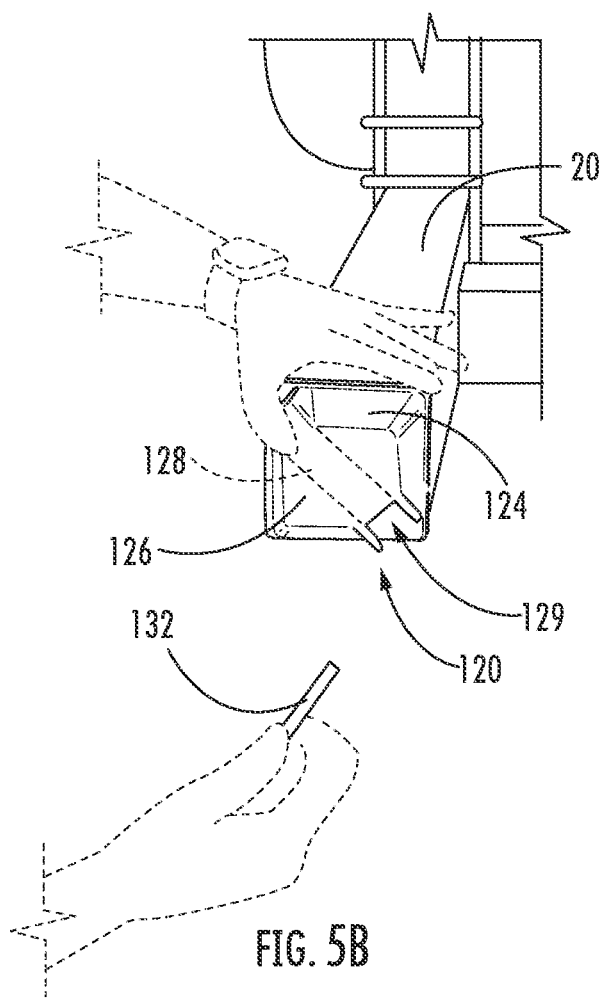

FIGS. 5A and 5B show an example method for the installation or removal of the fastener 132 from the bracket 120 during assembly or disassembly of the support structure 100. In order to insert and attach, or to detach and remove, one of the support rods 140 to/from one of the brackets 120, the pin of the fastener 132 cannot be inserted into the bracket 120 in a position that would block passage of the support rod 140 through the entire length of the channel 128, including into and/or through the securing end 129 thereof, as such a position of the fastener 132 would prevent the hole formed in the support rod 140, which is provided for securing the support rod 140 to the bracket 120 via passage of the fastener 132 therethrough, from being able to be positioned coaxial with the holes formed through the side walls that define the securing end 129 of the channel 128, through which the pin of the fastener 132 is insertable. As shown in FIG. 5A, the loop section of the fastener 132, which is provided to prevent unintended disengagement of the pin portion of the fastener 132 from the respective hole(s) of the support rod 140 and bracket 120, is disengaged from a first, or distal, end of the pin of the fastener 132 and is then pivoted about a second, or proximal, end of the pin of the fastener 132, to which the loop section is pivotably attached. Once the loop section of the fastener 132 is disengaged from the distal end of the pin of the fastener 132, the pin can be removed (e.g., by pulling) from the holes formed in the side walls of the securing end 129 of the channel 128 and, when the support rod 140 is present within the securing end 129 of the channel 128, also from the hole formed through the support rod 140 that is coaxial to such holes formed in the side walls of the securing end 129 of the channel 128. The removal of the pin from such hole(s) allows for passage of the support rod 140 through the channel 128 for insertion, during assembly of the support structure 100, or removal, during disassembly of the support structure 100. FIG. 5B shows that the pin of the fastener 132 has been removed from the position in which passage of the support rod 140 through the channel 128 is obstructed, thereby allowing unrestricted motion of the support rod 140 through the channel 128 in the axial direction (e.g., the direction of extension) of the channel 128, such that the hole formed in the support rod 140 can be aligned coaxial with the holes formed in the side walls of the securing end 129 of the channel 128. As noted elsewhere herein, when the support rod 140 is properly positioned within the channel 128 such that the hole(s) formed through the support rod 140 are coaxial with the holes formed through the side walls of the securing end 129 of the channel 128, the pin of the fastener 132 is inserted through the holes formed in the side walls of the securing end 129 of the channel 128 and also through the hole(s) formed through the support rod 140, thereby securing the support rod 140 within the channel 128 and preventing removal of the support rod 140 from the channel 128 without the pin of the fastener 132 being removed in the opposite direction of insertion. After the pin of the fastener 132 has been fully engaged (e.g., has passed through the holes formed in each of the side walls of the securing end 129 of the channel 128), the loop section of the fastener 132 is pivoted about the proximal end of the pin, such that the loop section is secured over the distal end of the pin to prevent the pin from being unintentionally dislodged, or disengaged, therefrom during use of the support structure 100, which can even include during movement of the conveyance 10 to which the support structure is attached.

Figure 6A:
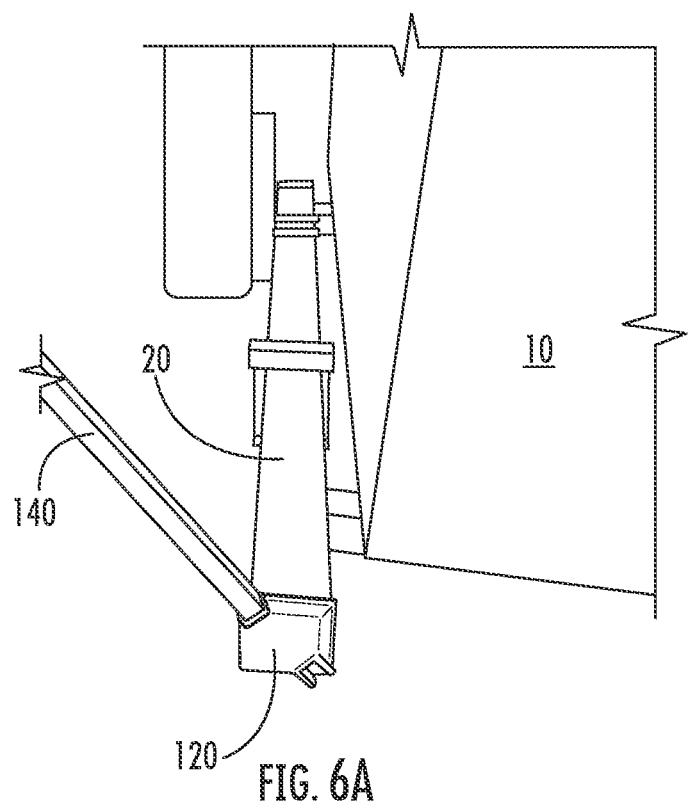
FIGS. 6A and 6B show the support rod being inserted within an attachment portion of a bracket of the support structure.
Figure 6B:
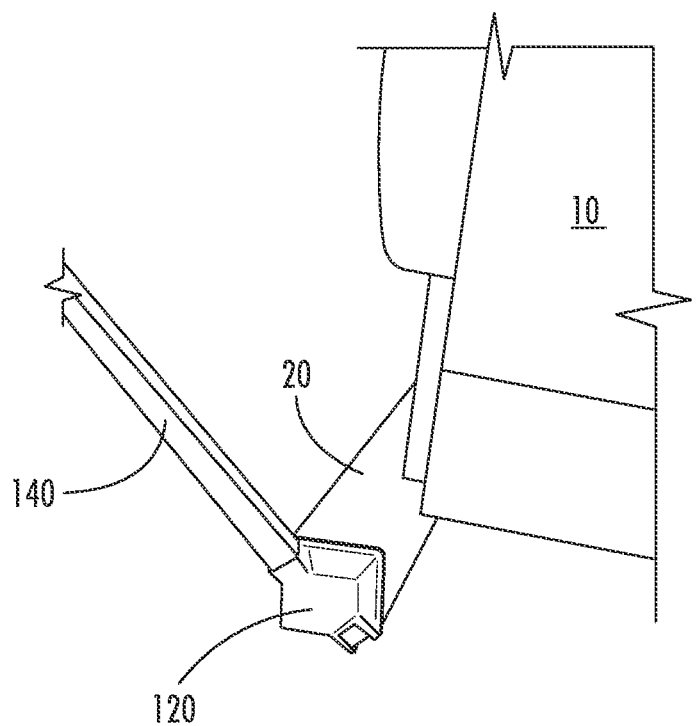

FIGS. 6A and 6B show one of the support rods 140 of the support structure 100 as the support rod 140 is being attached to one of the brackets 120 (e.g., via insertion into a channel 128). As shown in FIG. 6A, the support rod 140 is positioned to be aligned (e.g., coaxial) with the channel 128 formed in the attachment portion 124 of the bracket 120. The support rod 140 is then inserted to the installed position, shown in FIG. 6B, in which the support rod 140 extends substantially through an entire length of the channel 128 (e.g., at least extending partially into, fully into, or beyond the securing end 129 of the channel 128). The fastener 132 is shown to secure the support rod 140 within the channel 128 to prevent the support rod 140 from being unintentionally disengaged from the bracket 120 during use of the support structure 100.

In the example embodiment of the support structure 100 shown and described herein, the support rods 140 are spaced apart from each other by a distance of about 8 feet, which corresponds generally to the width of the portion 20 of the conveyance 10, and the support rods 140 each have six attachment points 144, such that the support structure 100 can have as many as six support lines 160 suspended between the support rods 140 to provide an effective length equivalent to a conventional clothesline, which has a length of 48 feet. In the example embodiment of the support structure 100, the attachment points 144 are uniformly spaced apart from each other along the length of the support rods 140, but any spacing and/or pattern for the attachment points 144 along the length of the support rods 140 may be used. In the example embodiment of the support structure 100, the support structure 100 can hold items weighing at least 60 pounds. The support structure 100 is not limited to supporting only items that weigh less than 60 pounds, however, as the support rods 140, support lines 160, and/or brackets 120 can be designed to hold substantially any desired weight. In the example embodiment of the support structure 100, the coupling portion 122 of the bracket 120 is configured for insertion within a structure (e.g., portion 20, such as a bumper of a recreational vehicle) having a 4 inch by 4 inch cross-sectional profile, or area, which is a common cross-sectional shape for the bumpers of many recreational vehicles, however the coupling portion 122 is not limited to such example dimensions and can have any desired shape, size, profile, and the like without limitation.

The invention claimed is:

1. An apparatus for supporting one or more items in an air flow from a conveyance, the apparatus comprising:
   first and second brackets that are each configured for rigid attachment to a portion of the conveyance;
   first and second support rods that are removably attachable to the first and second brackets, respectively, and extend away from the portion of the conveyance; and
   at least one support line attached between the first and second support rods, the at least one support line being configured such that the one or more items are supported from the at least one support line in a manner such that each of the one or more items is substantially spaced apart from others of the one or more items to allow the air flow around and/or through each of the one or more items;
   wherein the first bracket comprises:
      a coupling portion configured for at least partial insertion within a first end of the portion of the conveyance;
      an attachment portion configured to receive the first support rod therein; and
      a flange that is positioned between the coupling portion and the attachment portion, such that the attachment portion is separated from the coupling portion by the flange to extend beyond the first end of the portion of the conveyance; and
   wherein the second bracket comprises:
      a coupling portion configured for at least partial insertion within a second end of the portion of the conveyance, wherein the second end is opposite from the first end;
      an attachment portion configured to receive the second support rod therein; and
      a flange that is positioned between the coupling portion and the attachment portion, such that the attachment portion is separated from the coupling portion by the flange to extend beyond the second end of the portion of the conveyance.

2. The apparatus of claim 1, wherein the first bracket is spaced apart from the second bracket along a length of the portion of the conveyance.

3. The apparatus of claim 1, wherein the at least one support line comprises a plurality of support lines, wherein the first and second support rods extend away from the attachment portions, respectively, of the first and second brackets, wherein the first and second support rods have attachment points arranged along a length of the first and second support rods, and wherein each of the plurality of support lines is attached between corresponding ones of the attachment points on the first and second support rods.

4. The apparatus of claim 3, wherein the attachment points of the first support rod and the attachment points of the second support rods have a substantially identical spacing pattern, such that each of the plurality of support lines are substantially parallel to each other.

5. The apparatus of claim 1, wherein:
   the attachment portion of the first bracket comprises a channel, which has an internal cross-sectional profile that is substantially similar to an outer cross-sectional profile of the first support rod, such that the first support rod is configured for insertion through the channel for being supported from the first bracket; and
   the attachment portion of the second bracket comprises a channel, which has an internal cross-sectional profile that is substantially similar to an outer cross-sectional profile of the second support rod, such that the second support rod is configured for insertion through the channel for being supported from the second bracket.

6. The apparatus of claim 1, wherein the first and second support rods extend away from the at least one bracket in a direction that is inclined at an angle from a vertical direction, the vertical direction being orthogonal to a direction of transit of the conveyance.

7. The apparatus of claim 1, wherein the at least one bracket comprises a metal and/or a plastic, wherein the first and second support rods comprise a metal, and wherein the at least one support line comprises a metal or a textile material.

8. The apparatus of claim 1, wherein the conveyance comprises an automobile, truck, recreational vehicle, boat, and/or camper.

9. The apparatus of claim 1, wherein:
   the attachment portion of each of the first and second brackets comprises a channel; and
   both longitudinal ends of the channel are open.

10. The apparatus of claim 9, wherein:
the first bracket comprises an impact surface that defines an outer surface of the first bracket that is coplanar with an upper surface of the attachment portion of the first bracket;
the channel of the attachment portion of the first bracket is enclosed along a length thereof by the impact surface of the first bracket;
the second bracket comprises an impact surface that defines an outer surface of the second bracket that is coplanar with an upper surface of the attachment portion of the second bracket; and
the channel of the attachment portion of the second bracket is enclosed along a length thereof by the impact surface of the second bracket.

11. The apparatus of claim 10, wherein:
one of the longitudinal ends of the channel formed in the first bracket is a securing end, where an extent of the impacting surface of the first bracket is truncated to not cover the securing end of the first bracket; and
one of the longitudinal ends of the channel formed in the second bracket is a securing end, where an extent of the impacting surface of the second bracket is truncated to not cover the securing end of the second bracket.

12. The apparatus of claim 11, wherein:
the channel of the attachment portion of the first bracket is defined, at least partially, by two side walls that are parallel to each other;
at the securing end of the channel of the first bracket, each of the two side walls thereof has a hole formed therethrough, the hole of each of the two side walls of the channel of the first bracket being aligned with each other;
the channel of the attachment portion of the second bracket is defined, at least partially, by two side walls that are parallel to each other;
at the securing end of the channel of the second bracket, each of the two side walls thereof has a hole formed therethrough, the hole of each of the two side walls of the channel of the second bracket being aligned with each other;
the apparatus comprising:
a first fastener for the first bracket, the first fastener being configured for insertion through the hole of each of the two side walls of the channel of the attachment portion of the first bracket to secure the first support rod within the channel of the attachment portion of the first bracket; and
a second fastener for the second bracket, the second fastener being configured for insertion through the hole of each of the two side walls of the channel of the attachment portion of the second bracket to secure the second support rod within the channel of the attachment portion of the second bracket.

13. A method of supporting one or more items in an air flow from a conveyance, the method comprising:
rigidly attaching first and second brackets to a portion of the conveyance;
attaching a first support rod to the first bracket in a removable manner, such that the first support rod extends away from the portion of the conveyance;
attaching a second support rod to the second bracket in a removable manner, such that the second support rod extends away from the portion of the conveyance;
attaching at least one support line between the first and second support rods;
placing the one or more items for support from the at least one support line, such that each of the one or more items is substantially spaced apart from others of the one or more items to allow the air flow around and/or through each of the one or more items;
at least partially inserting a coupling portion of the first bracket within a first end of the portion of the conveyance;
at least partially inserting a coupling portion of the second bracket within a second end of the portion of the conveyance, wherein the second end is opposite from the first end;
receiving the first support rod within an attachment portion of the first bracket; and
receiving the second support rod within an attachment portion of the second bracket;
wherein the first bracket comprises a flange that is positioned between the coupling portion of the first bracket and the attachment portion of the first bracket, such that the attachment portion of the first bracket is separated from the coupling portion of the first bracket by the flange of the first bracket and such that the attachment portion of the first bracket extends beyond the first end of the portion of the conveyance; and
wherein the second bracket comprises a flange that is positioned between the coupling portion of the second bracket and the attachment portion of the second bracket, such that the attachment portion of the second bracket is separated from the coupling portion of the second bracket by the flange of the second bracket and such that the attachment portion of the second bracket extends beyond the second end of the portion of the conveyance.

14. The method of claim 13, wherein the first bracket is spaced apart from the second bracket along a length of the portion of the conveyance.

15. The method of claim 13, wherein the at least one support line comprises a plurality of support lines, wherein the first and second support rods extend away from the attachment portions, respectively, of the first and second brackets, wherein the first and second support rods have attachment points arranged along a length of the first and second support rods, and wherein each of the plurality of support lines is attached between corresponding ones of the attachment points on the first and second support rods.

16. The method of claim 15, wherein the attachment points of the first support rod and the attachment points of the second support rods have a substantially identical spacing pattern, such that each of the plurality of support lines are substantially parallel to each other.

17. The method of claim 13, wherein:
the attachment portion of the first bracket comprises a channel, which has an internal cross-sectional profile that is substantially similar to an outer cross-sectional profile of the first support rod; and
the attachment portion of the second bracket comprises a channel, which has an internal cross-sectional profile that is substantially similar to an outer cross-sectional profile of the second support rod;
the method comprising:
inserting the first support rod through the channel of the first bracket, such that the first support rod is supported from the first bracket; and
inserting the second support rod through the channel of the second bracket, such that the second support rod is supported from the second bracket.

18. The method of claim 13, wherein:
the first and second support rods extend away from the at least one bracket in a direction that is inclined at an angle from a vertical direction, the vertical direction being orthogonal to a direction of transit of the conveyance; and/or
the at least one bracket comprises a metal and/or a plastic, wherein the first and second support rods comprise a metal, and wherein the at least one support line comprises a metal or a textile material; and/or
the conveyance comprises an automobile, truck, recreational vehicle, boat, and/or camper.

\* \* \* \* \*